United States Patent [19]

Takeda

[11] Patent Number: 5,154,595
[45] Date of Patent: Oct. 13, 1992

[54] FIXING MECHANISM FOR A TIMING GEAR SYSTEM

[75] Inventor: Toshio Takeda, Nagoya, Japan

[73] Assignee: Aisin Seiki Kabushiki Kaisha, Kariya, Japan

[21] Appl. No.: 740,878

[22] Filed: Jul. 31, 1991

Related U.S. Application Data

[63] Continuation of Ser. No. 469,270, Jan. 24, 1990, abandoned.

[30] Foreign Application Priority Data

Jan. 31, 1989 [JP] Japan .................. 1-11228[U]

[51] Int. Cl.⁵ .................. F01C 1/16; F01C 1/18; F01C 17/02; F16B 7/02
[52] U.S. Cl. .................. 418/201.1; 418/206; 403/356; 403/370
[58] Field of Search .................. 418/206, 201.1; 403/367, 370, 371, 355, 356; 74/431, 434; 474/903

[56] References Cited

U.S. PATENT DOCUMENTS

| | | | |
|---|---|---|---|
| 1,771,769 | 7/1930 | Brunner | 403/370 |
| 1,781,619 | 11/1930 | Wendell | 418/206 |
| 1,834,976 | 12/1931 | Schmidt | 418/206 |
| 2,755,093 | 7/1956 | Peter et al. | 403/370 |
| 4,576,503 | 3/1986 | Orain | 403/370 |
| 4,886,437 | 12/1989 | Schubert | 418/206 |

FOREIGN PATENT DOCUMENTS

| | | | |
|---|---|---|---|
| 700038 | 12/1940 | Fed. Rep. of Germany | 403/370 |
| 2601138 | 7/1977 | Fed. Rep. of Germany | 403/370 |
| 62-31789 | 2/1987 | Japan . | |
| 62-43190 | 3/1987 | Japan . | |
| 62-57785 | 4/1987 | Japan . | |
| 62-119491 | 7/1987 | Japan . | |
| 63-130633 | 8/1988 | Japan . | |
| 63-190581 | 12/1988 | Japan . | |
| 82182 | 12/1934 | Sweden | 418/206 |
| 254047 | 12/1948 | Switzerland | 403/370 |
| 318568 | 2/1957 | Switzerland | 418/206 |
| 314006 | 9/1971 | U.S.S.R. | 403/370 |
| 100027 | of 1916 | United Kingdom . | |
| 263871 | 9/1927 | United Kingdom | 403/356 |

*Primary Examiner*—John J. Vrablik
*Attorney, Agent, or Firm*—Oblon, Spivak, McClelland, Maier & Neustadt

[57] ABSTRACT

A fixing mechanism for a timing gear system used in a compressor has a pair of timing gears engaging each other and a pair of shafts mounting the pair of the timing gears. At least one of the pair of timing gears is divided into a gear part and a sleeve part having matching tapered faces. The tapered faces are pressed by a nut onto one another so that the gear part is fixed to the shaft.

5 Claims, 3 Drawing Sheets

5,154,595

FIXING MECHANISM FOR A TIMING GEAR SYSTEM

This application is a continuation of application Ser. No. 07/469,270, filed on Jan. 24, 1990, now abandoned.

BACKGROUND OF THE INVENTION

1. Field of the Invention

The present invention relates to a fixing mechanism for a timing gear system used in a two-shaft displacement type compressor. For example, a roots type compressor, a wankel type compressor, a screw type compressor, etc.

2. Description of the Related Art

A fixing mechanism for a timing gear system is shown in Japanese Utility Model Laid-open Publication 60-143182 and Japanese Patent Laid-Open Publication 63-179192. As seen in FIGS. 6 and 7, they disclose a two-shaft displacement type compressor which has a pair of rotors 61, 62 that rotate to suck in a fluid and exhaust it.

In the mechanism of FIG. 6, the rotors 61, 62 rotate together, with a slight gap (0.2~0.5 mm), by the engaging of timing gears 65, 66 fixed to shafts 63, 64 by keys 67, 68. The timing gears may instead be fixed to the shaft by a spline (not shown in FIG. 6).

In the mechanism of FIG. 7, tapered faces are formed on shafts 71, 72 and on timing gears 73, 74. The timing gears 73, 74 are fitted to the shafts 71, 72 on the tapered faces and are fixed thereto by bolts 75, 76.

However, these known fixing mechanisms for a timing gear system have the following defects.

A key groove restricts a setting position of the timing gear to the shaft. Therefore machining errors and setting errors of the key grooves of the timing gear and the rotor, and in the sectional form of the teeth of the timing gear, can cause a phase difference of the rotors. In order to avoid the defect, it is necessary to maintain high cutting accuracy. But such machining is very difficult and therefore productivity falls off and manufacturing costs increase greatly. In order to avoid contact between the rotors, it is necessary to design the gap between the rotors to be large. Therefore the compression characteristics of the key-type compressor are poor.

On the other hand, in a compressor having shafts formed with a tapered face, errors in the taper angle and the diameter of the tapered face cause axial aberrations of the timing gears. Also, it is difficult to use a spacer between the step of the shaft, the bearing and the timing gear, because a gap then occurs between the tapered faces.

SUMMARY OF THE INVENTION

It is an object of the invention to provide a fixing mechanism for a timing gear system which obviates the above mentioned drawbacks of the conventional system.

The above, and other, objects are accomplished according to the present invention but by a rotary machine having two synchronously rotating rotors mounted on two rotor shafts and means for rotating the rotors in synchronism. The means for rotating the rotors in synchronism comprise a timing gear nonrotatably mounted on a journal part of each of the shafts, the timing gears meshing with one another to rotate the rotors in synchronism, and means for nonrotatably mounting a gear part of at least one of the timing gears on the rotors. The means for mounting comprise means for applying axial forces to each of the gear parts, and means for converting the axial forces into radial forces such that each gear part is frictionally locked to rotate with a respective shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENT

Figure 1:
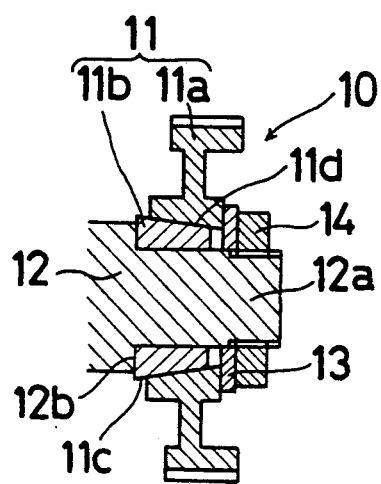
FIG. 1 shows a sectional view of a first embodiment of a fixing mechanism of this invention.

In FIG. 1, a timing gear 11 is divided into a gear part 11a and a sleeve part 11b respectively formed with tapered faces 11c, 11d, with the left-side diameter of the sleeve part 11b being larger than its right-side diameter (as seen in FIG. 1). First, the sleeve part 11b is mounted on a journal part 12a of the shaft 12 and contacted with a stepped end face 12b of the shaft 12. Next, the gear part 11a is mounted on the sleeve part 11b and a washer 13 is contacted to an end face of the gear part 11a. The gear part 11a and the sleeve part 11b are axially pressed together at the tapered faces 11c, 11d by a nut 14. The sleeve part 11b may be rotationally connected to the journal part 12a by an element capable of preventing relative rotational movement of the sleeve part on the journal part due to a non-circular section thereof, such as a key 18 or splines (not shown in FIG. 1).

Figure 2:
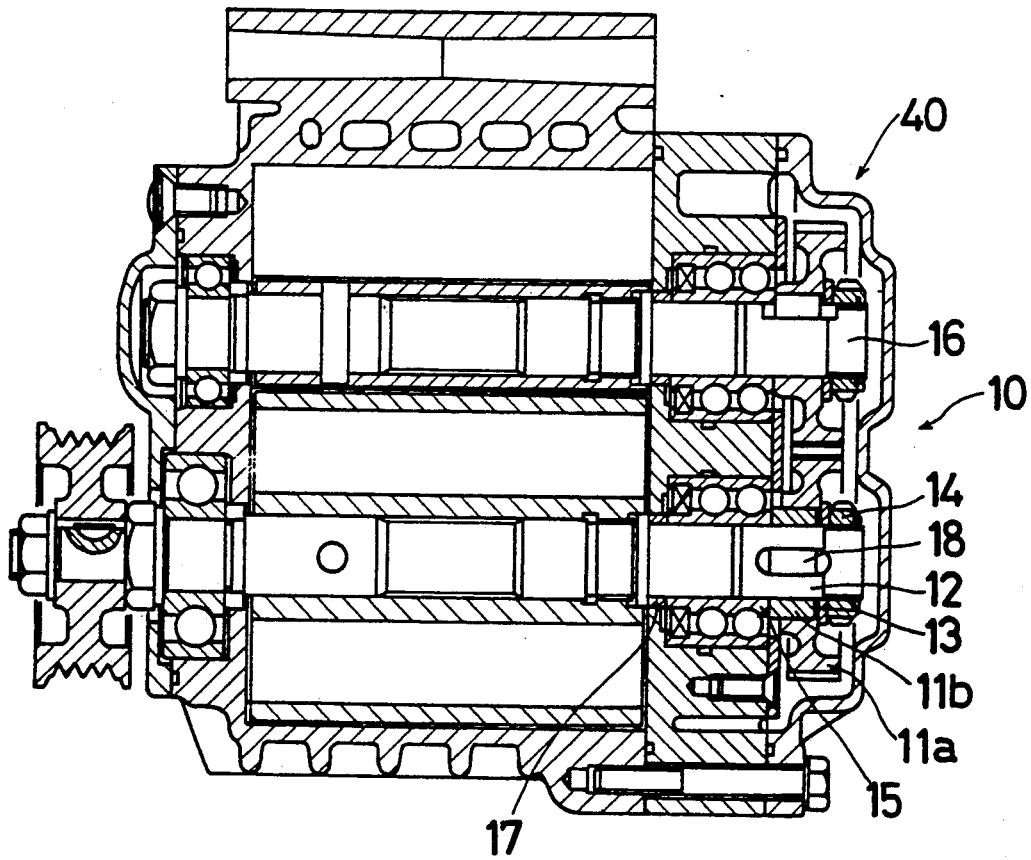
FIG. 2 shows a sectional view of a compressor using the first embodiment of a fixing mechanism of this invention.

As can be seen in FIG. 2, while shaft 12 has the sleeve part 11b, the other timing gear is mounted directly to shaft 16 via only a key (unnumbered). In FIG. 2, a compressor 40 uses the fixing mechanism 10 shown in FIG. 1, but the left end of the sleeve part 11b contacts an end face of a ball bearing 15, although it could instead contact the end face of any other element fixed to the shaft 12. A cylindrical spacer 17 is disposed at the left side of the bearing 15 to control the shaft position with respect to the bearing 15. It is possible to also employ the fixing mechanism 10 as a fixing mechanism on the shaft 16. It is also possible to omit the key 18 or a spline (not shown in FIG. 1), and to use a radially thin sleeve 11b.

Because the sleeve 11b is press-fitted to the shaft 12 by the nut 14 and radially deformed onto the journal part 12a, a frictional engagement is thereby caused between the sleeve 11b and the journal part 12a. That is, the axial force of the nut 14 is converted by the tapered faces 11c and 11d into radial forces.

Figure 3:
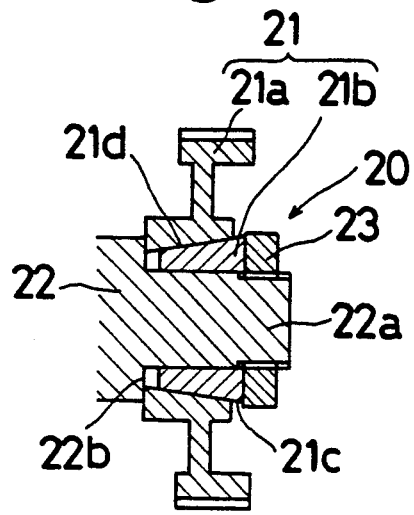
FIG. 3 shows a sectional view of a second embodiment of a fixing mechanism of this invention.

In FIG. 3, a timing gear 21 is divided into a gear part 21a and a sleeve part 21b respectively formed with tapered faces 21c, 21d with the right-side diameter of the sleeve part 21b being larger than the left-side diameter thereof (as seen in FIG. 3). The left side of the gear part 21a has a smaller inner diameter than does the right side. First, the gear part 21a is mounted on the journal part 22a of the shaft 22 and contacted to a step means in the form of a stepped end face 22b of the shaft 22. Next the sleeve part 21b is inserted between the journal part 22a and the gear part 21a and pressed into the gear part 21a, to contact the tapered faces 21c, 21d, by a nut 23 while leaving an axial space between the end face 22b and the sleeve part 21b. The sleeve part 21b may be rotatably fixed to the journal part 22a by a key 28 or splines (not shown in FIG. 3). The large radial width end of the gear part engages the stepped end face 22b of the shaft to precisely axially position the gear part.

Figure 4:
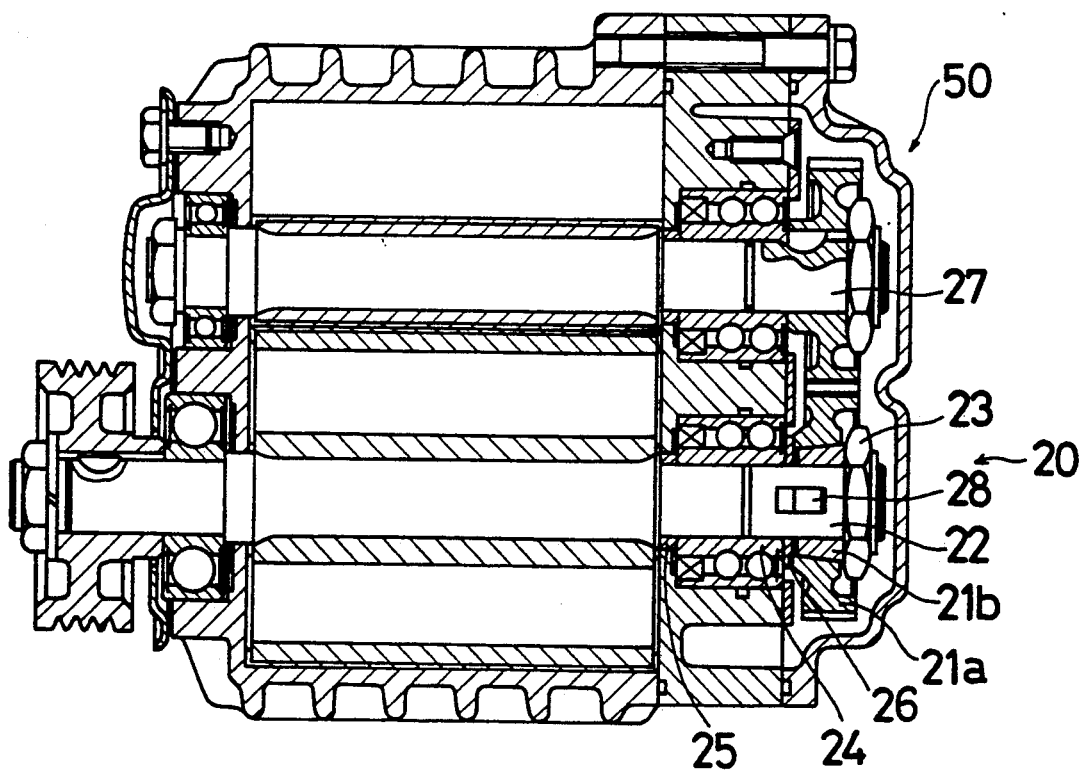
FIG. 4 shows a sectional view of a compressor using the second embodiment of a fixing mechanism of this invention.
Figure 6:
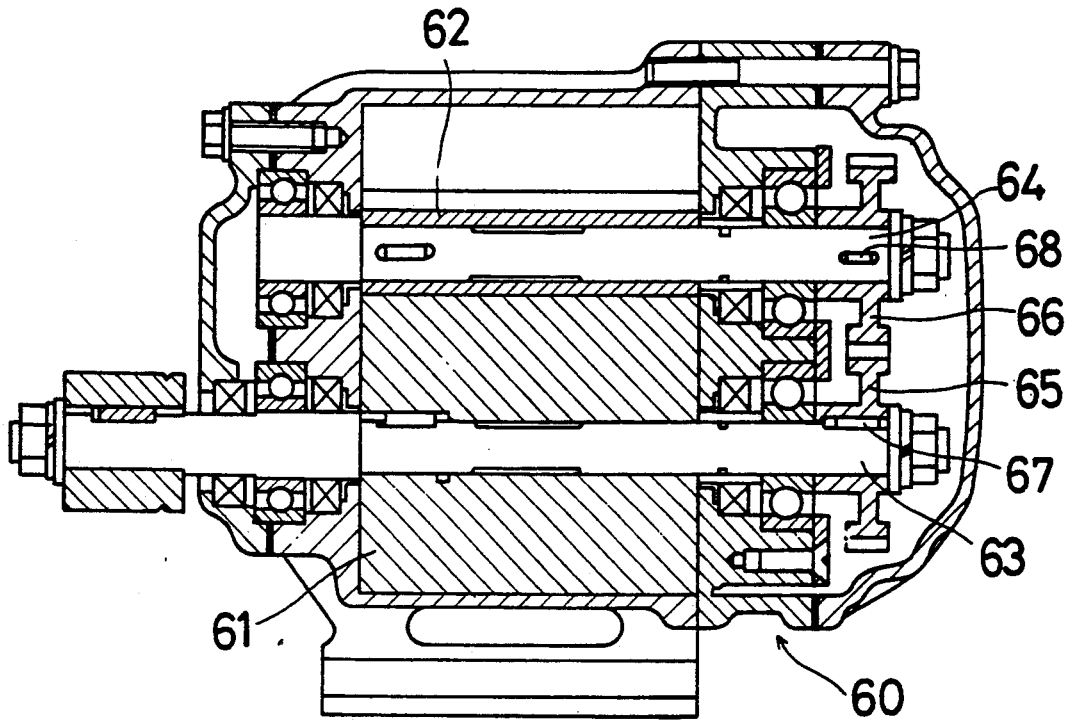
FIG. 6 shows a sectional view of a conventional fixing mechanism.
Figure 7:
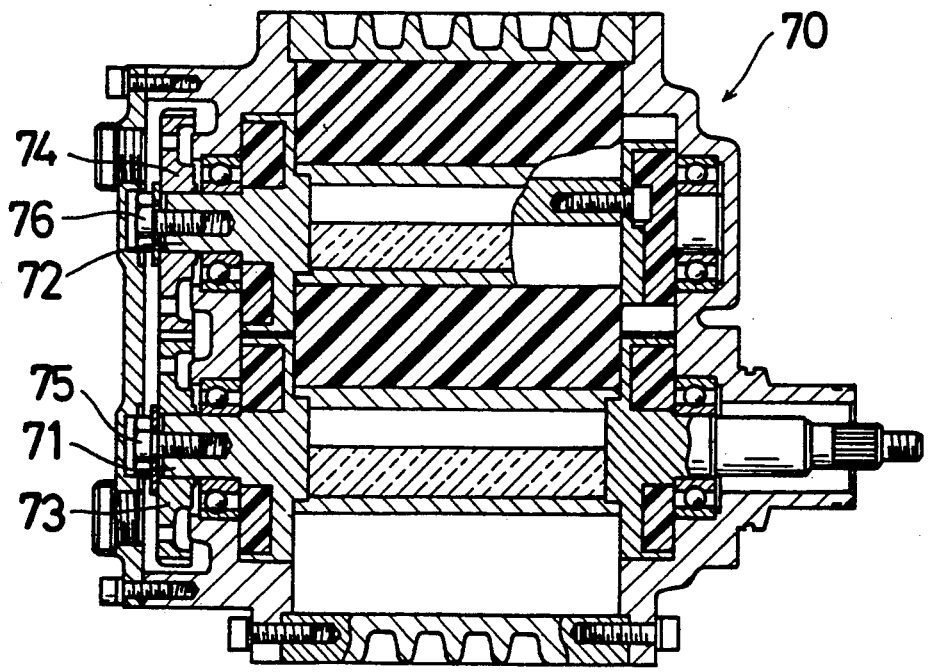
FIG. 7 shows a sectional view of another conventional fixing mechanism.

In FIG. 4 a compressor 50 uses the fixing mechanism 20 shown in FIG. 3, but the left end of the gear part 21a contacts a cylindrical spacer 26 disposed at the right side of the bearing 24. In this case the face of the cylindrical spacer which, like the stepped end face 22b forms a surface in a plane transverse to the shaft axis and on which the gear part engages, comprises the step means. A cylindrical spacer 25 is disposed on the left side of the bearing 24. It is possible to also employ the fixing mechanism 20 as a fixing mechanism on the shaft 27. As stated with regard to FIG. 2, it is also possible to use a radially thin sleeve part, for the same reason.

Figure 5:
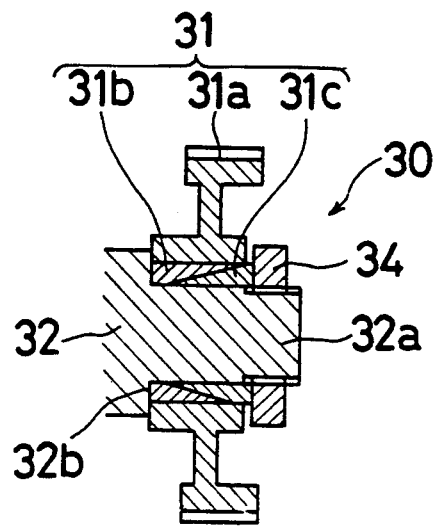
FIG. 5 shows a sectional view of a third embodiment of a fixing mechanism of this invention.

In FIG. 5 the timing gear 31 is divided into a gear part 31a and two sleeve parts 31b, 31c. The two sleeve parts 31b, 31c have tapered faces contacting each other. The outer face of tee sleeve part 31b fits in the inner face of the gear part 31a and the inner face of the sleeve part 31c fits on the journal part 32a of the shaft 32. The left ends of the gear part 31a and the sleeve part 31b contact the step 32b of the shaft 32. They are fixed by friction at their contacting faces via a nut 34 pressing the faces tightly together. The tapered faces are formed such that the right-side diameter of the sleeve par 31c is larger than the left-side diameter thereof, as seen in FIG. 5. It is instead possible to form them oppositely.

In the above mentioned embodiment, the angular position of the timing gear on the rotor is adjusted by the rotational movement of the rotor and its shaft, before the nut is fixed to the shaft. The axial position of the timing gear is adjusted by the spacer 17 or 25.

In the first embodiment, it is easy to construct the timing gear, because the sleeve part is first mounted on the shaft and then the gear part is mounted on the sleeve part.

In the second embodiment, the end face of the gear part contacts the stepped end face of the shaft directly. Therefore the gear part is fixed rigidly to the shaft, and the teeth of the two timing gears are engaged exactly with each other.

In the third embodiment, the inner face of the gear part is finished to exactly match with the outer surfaces of the sleeve parts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a rotary machine having two synchronously rotating rotors mounted on two rotor shafts, means for rotating said rotors in synchronism, comprising:
    a first timing gear directly and non-rotatably mounted to one of said shafts via a non-circular section means for preventing relative rotation therebetween;
    a second timing gear non-rotatably mounted on a journal part of the other of said shafts, said timing gears meshing with one another to rotate said rotors in synchronism; and
    means for non-rotatably mounting a gear part of said second timing gear on said other shaft, comprising:
    a) means for applying an axial force to said gear part, and
    b) means for converting said axial force into radial forces such that said gear part is frictionally locked to rotate with a respective shaft,
    wherein said converting means comprises:
    a sleeve mounted on said journal part by non-circular section means for preventing relative rotation therebetween, said sleeve having an axially tapered outer surface; and
    an axially tapered inner surface of said gear part, said inner surface being tapered to match the taper of said sleeve before assembly of said gear part on said sleeve and being at least partially mounted on said outer surface,
    wherein said means for applying an axial force comprises a nut threaded on said journal part and engaging only said sleeve, and
    wherein said gear part has a small inner diameter end engaging a stepped means associated with said shaft and has an engaging surface in a plane transverse to the shaft axis.

2. The rotary machine of claim 1 wherein said rotary machine comprises a compressor.

3. The rotary machine of claim 1, wherein said non-circular section means for preventing relative rotation comprises a key mounted between the sleeve and the journal part on which the sleeve is mounted.

4. The rotary machine of claim 1, wherein said stepped means comprises a stepped part mounted on said shaft.

5. The rotary machine of claim 4 wherein said sleeve part is axially spaced from said stepped means to form an axial space therebetween.

* * * * *